United States Patent
Pontiller-Schymura et al.

(10) Patent No.: US 10,821,673 B2
(45) Date of Patent: Nov. 3, 2020

(54) METHOD FOR OPERATING AN APPARATUS FOR ADDITIVELY MANUFACTURING THREE-DIMENSIONAL OBJECTS

(71) Applicant: CONCEPT LASER GMBH, Lichtenfels (DE)

(72) Inventors: Peter Pontiller-Schymura, Neudrossenfeld (DE); Frank Schödel, Kronach (DE); Boris Eichenberg, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 55 days.

(21) Appl. No.: 16/179,790

(22) Filed: Nov. 2, 2018

(65) Prior Publication Data

US 2019/0217543 A1    Jul. 18, 2019

(30) Foreign Application Priority Data

Jan. 12, 2018   (EP) ..................... 18151419

(51) Int. Cl.
*B29C 64/153* (2017.01)
*B29C 64/393* (2017.01)
(Continued)

(52) U.S. Cl.
CPC .......... *B29C 64/393* (2017.08); *B22F 3/1055* (2013.01); *B29C 64/153* (2017.08);
(Continued)

(58) Field of Classification Search
CPC ... B29C 64/153; B29C 64/165; B29C 64/245; B29C 64/268; B29C 64/371; B29C 64/393
See application file for complete search history.

(56) References Cited

U.S. PATENT DOCUMENTS

| | | | |
|---|---|---|---|
| 8,172,562 B2 | 5/2012 | Mattes | |
| 2002/0188369 A1* | 12/2002 | Guertin | G05B 19/4099 700/119 |
| 2004/0169699 A1* | 9/2004 | Hunter | B29C 64/165 347/54 |

(Continued)

FOREIGN PATENT DOCUMENTS

| | | |
|---|---|---|
| DE | 102016109941 A1 | 11/2017 |
| EP | 3222409 A1 | 9/2017 |
| JP | 2005/534543 A | 11/2005 |

OTHER PUBLICATIONS

Weiming Wang et al, "Saliency-Preserving Slicing Optimization for Effective 3D Printing", Computer Graphics Forum, Jan. 28, 2015, pp. 148-160, XP055483825, Oxford, Retrieved from the Internet: URL:https://www.microsoft.com/en-us/research/wp-content/uploads/2016/12/2015_CGF_AdaptiveSlicing.pdf [retrieved Jun. 12, 2018].

(Continued)

*Primary Examiner* — Kidest Bahta
(74) *Attorney, Agent, or Firm* — Dority & Manning, P.A.

(57) ABSTRACT

Method for operating at least one apparatus (1) for additively manufacturing of three-dimensional objects (2) by means of successive layerwise selective irradiation and consolidation of layers of a build material (3) which can be consolidated by means of an energy source, wherein slice data are provided relating to an application of build material (3) in at least one section (14-18) of an object (2) to be built, wherein the slice data comprise a number of slices relating to corresponding layers of build material (3) to be applied, wherein the slice data comprise a number of first slices corresponding to a first section (14-18) of the object (2) and at least a number of second slices corresponding to at least a second section (14-18) of the object (2), wherein the number of first slices and the number of second slices differ.

19 Claims, 2 Drawing Sheets

Figure 1:
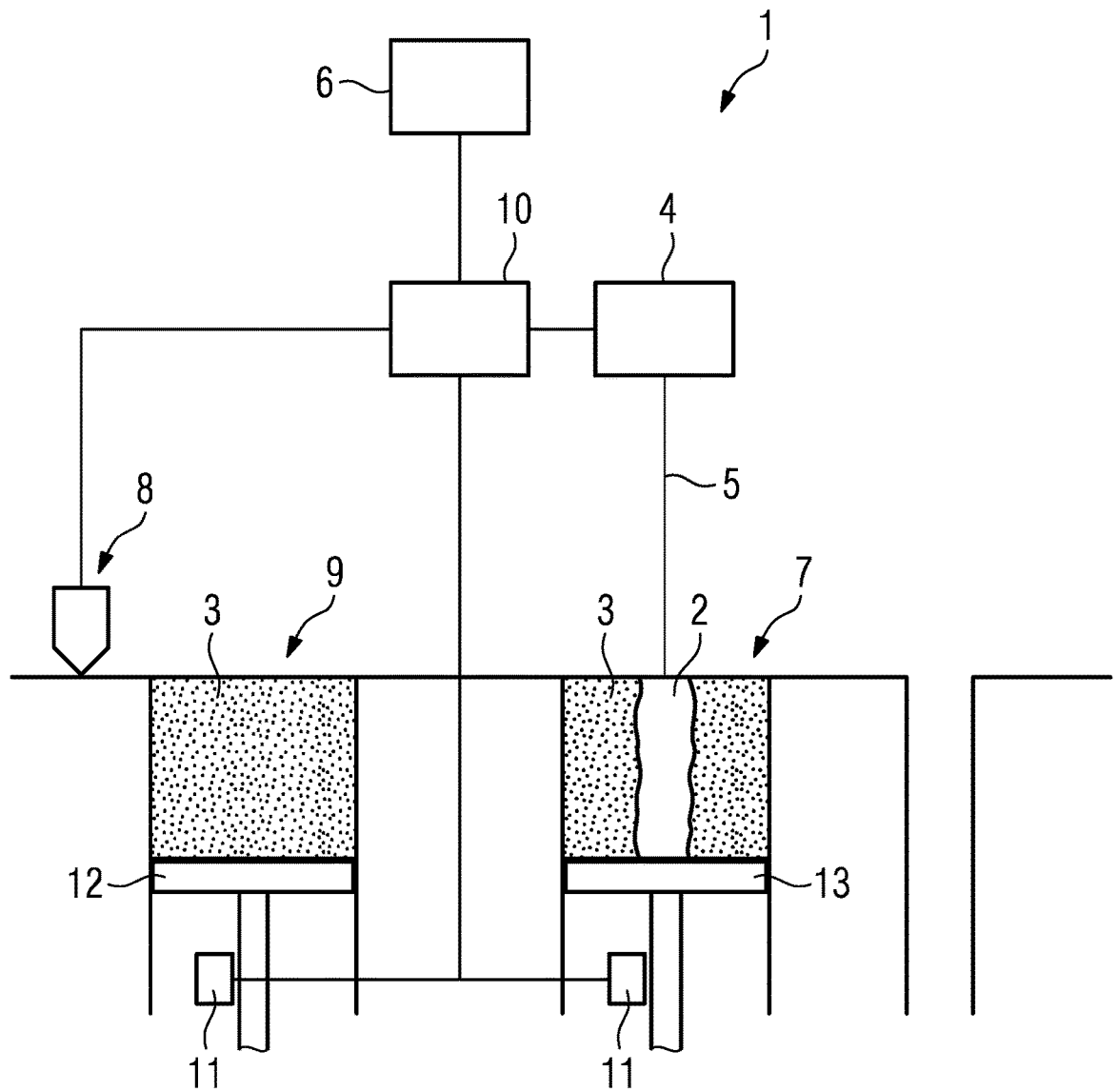

(51) Int. Cl.
| | |
|---|---|
| *B29C 64/245* | (2017.01) |
| *B29C 64/268* | (2017.01) |
| *B29C 64/371* | (2017.01) |
| *B22F 3/105* | (2006.01) |
| *B29C 64/165* | (2017.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/245* (2017.08); *B29C 64/268* (2017.08); *B29C 64/371* (2017.08); *B22F 2003/1057* (2013.01); *B22F 2003/1058* (2013.01); *B22F 2201/11* (2013.01); *B29C 64/165* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2014/0163717 A1* | 6/2014 | Das | C30B 13/28 700/119 |
| 2016/0236279 A1* | 8/2016 | Ashton | G01J 3/28 |
| 2016/0349724 A1* | 12/2016 | Cortes | B33Y 50/00 |
| 2017/0274597 A1 | 9/2017 | Amaya et al. | |

OTHER PUBLICATIONS

European Search Report Corresponding to Application No. 18151419 dated Jun. 15, 2018.
Machine Translated Japanese Office Action Corresponding to Application No. 2018128809 dated Jun. 18, 2019.
Machine Translated Japanese Office Action Corresponding to Application No. 2018128809 dated Mar. 26, 2020.

* cited by examiner

METHOD FOR OPERATING AN APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 151 419.1 filed Jan. 12, 2018, the contents of which is incorporated herein by reference in its entirety as if set forth verbatim.

The invention relates to a method for operating at least one apparatus for additively manufacturing three-dimensional objects by means of successive layerwise selective irradiation and consolidation of layers of a build material which can be consolidated by means of an energy source, wherein slice data are provided relating to an application of build material in at least one section of an object to be built, wherein the slice data comprise a number of slices relating to corresponding layers of build material to be applied.

Apparatuses for manufacturing of three-dimensional objects and methods for operating the same are generally known from prior art. Typically, said apparatuses are operated in that successively layers of build material are applied and consolidated, for example via irradiation with a corresponding energy source, such as selectively irradiating the applied layers of build material with an energy beam, for example a laser beam or an electron beam. The manufacturing of said three-dimensional objects is performed based on three-dimensional data that comprise inter alia the geometry of the three-dimensional object to be built.

Further, the geometry data, in particular three-dimensional data, provided for manufacturing the three-dimensional object are transferred into so-called slice data that relate to the application of build material, in particular in a build plane in which the build material can directly be irradiated to selectively consolidate the build material. The slice data provide information relating to how the build material is to be applied in the corresponding section, in particular a section of an object to be built. The slice data therefore, comprise a number of slices relating to the corresponding layers of build material to be applied. Said slices provide information relating to parameters of the application process regarding the corresponding layer of build material, e.g. a layer thickness.

Usually, the number of slices is directly related to the height of the object to be built or a dimension of the object along the z-direction (build direction), wherein the object is sliced in that a uniform distribution of slices or an equidistant distribution of slices over the object to be built is performed. In other words, all slices usually have the same dimensions in build direction leading to a uniform layer thickness.

It is an object of the invention to provide a method for operating at least one apparatus for additively manufacturing of three-dimensional objects, wherein the slice data are improved.

The object is inventively achieved by a method according to claim 1. Advantageous embodiments of the invention are subject to the dependent claims.

The method described herein is a method for operating an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device, which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a method for operating at least one apparatus for additively manufacturing of three-dimensional objects, in particular the generation and/or the provision of slice data. The invention provides a method that allows for having a non-uniform distribution of slices leading to a non-uniform layer thickness over the object (along the build direction). For example, the object may comprise at least one section in which another layer thickness has to be applied or layers with a differing layer thickness have to be applied differing from a layer thickness in at least one other section of the object. The application of layers with non-uniform layer thickness or the manufacturing of at least one section of the object in which a layer thickness differs from at least one other section of the object allows for taking into calculation that the geometry of the object may be non-uniform, e.g. comprise geometrical characteristics, wherein in at least one section another layer thickness is required, e.g. to manufacture geometrical details or characteristics of the object.

The application of layers of build material with different layer thicknesses allows for adjusting the fineness in which the object is sliced and manufactured, wherein a reduced number of slices leads to higher layer thickness allowing for larger manufacturing speeds to be achieved, as the size of the layer that is applied in one application step and consolidated in one consolidation step, in particular in an irradiation step, is larger than compared to a higher number of slices leading to a larger number of layers and a lower layer thickness. Accordingly, a larger number of slices leads to a larger number of layers and thus, a lower layer thickness, wherein it is possible to have the object built from finer (thinner) layers that can be successively applied and selectively irradiated. Preferably enabling geometrical features that are smaller than a standard layer thickness to be manufactured.

The invention is based on the idea that the slice data comprise a number of first slices corresponding to a first section of the object and at least a number of second slices corresponding to at least a second section of the object, wherein the number of first slices and the number of second slices differ, wherein the number of first slices per section height and the number of second slices per section height and/or the number of first slices per unit length and the number of second slices per unit length differ. Thus, it is possible to define at least two sections of the object, wherein the geometry of the object may particularly differ in the at least two sections. According to the invention, slice data are provided, wherein the first section of the object is sliced into first slices and the second section of the object is sliced into second slices, wherein of course, an arbitrary number of sections can be defined.

Additionally, it is possible that the number of slices in only one section differs from a number of slices corresponding to one or more other sections or it is possible that the number of slices of two or more sections differ from each other. For the sake of simplicity, in the course of this application it is exemplarily referred to an object that has at least a first section and a second section. Of course, it is also possible to have an object with an arbitrary number of sections, wherein the example relating to at least two sections is transferable to an object with an arbitrary number of sections.

As the object comprises at least two sections that are sliced differently or comprise a different number of first slices or second slices, respectively, the object is not sliced uniformly, but at least one section is provided that has a differing number of slices compared to at least one other section. The number of slices can, for example, be related to the section height, wherein the number of first slices in the first section and the number of second slices in the second section differs related to the height of the individual sections. The defined value "number of slices per section height" therefore, connects the number of slices with the height of the section of the object. For example, if the first section height is larger than the second section height and the first number of slices equals the second number of slices, the number of slices per section height differ in that the number of first slices per section height is smaller compared to the second number of slices per section height.

According to another approach, the number of slices may be related to a unit length, wherein the unit length can be arbitrarily defined, for example per µm or per mm. Thus, the number of slices can be related to a well-defined unit length, instead of the height of the section of the object, wherein the number of slices per unit length can also be deemed as slice density. Thus, a larger number of slices per unit length refers to a section of an object that is sliced finer than a corresponding section with a lower number of slices per unit length. In other words, with a larger number of slices per unit length a resulting layer thickness is thinner than with the same section having a lower number of slices per unit length resulting in a layer thickness that is thicker. Advantageously, the number of slices per unit length is independent of a section height and therefore, allows for a simplified comparison between two sections of the object.

By having the number of first slices per section height and the number of second slices per section height and/or the number of first slices per unit length and the number of second slices per unit length taking different values or defined differently, respectively, specific characteristics, such as a geometrical details of the object, can be taken into calculation in an improved manner, as sections with smaller details can be sliced finer resulting in a thinner layer thickness. Additionally, in sections of the object that do not comprise specific characteristics or details in the geometry, it is possible to choose or adjust a lower number of slices per unit length or per section height, respectively, to allow for comparatively thicker layers of build material to be applied and therefore, enhance the manufacturing speed or reduce the manufacturing time of a three-dimensional object, respectively.

According to a first embodiment of the present invention, a layer thickness of build material to be applied in the first section and a layer thickness in at least one second section differ. According to this embodiment, a direct relation between the number of slices and a resulting layer thickness of layers of build material that are applied during the additive manufacturing process can be established. Preferably, the number of slices or the "thickness" of the slice directly relates to the amount of build material, i.e. the thickness of the layer that is correspondingly applied using the slice data or the corresponding slice of the slice data, respectively. Besides, it is also possible to define a factor that is related with each slice, wherein the resulting layer thickness can be calculated having the factor and the corresponding slice multiplied resulting in the thickness of the layer that has to be applied.

The number of slices of at least one section, e.g. the number of first slices and/or the number of second slices (of the first section and/or a second section of the object) may be defined dependent on at least one parameter of the object. As described before, the object may comprise at least one section with a geometry that requires a defined number of slices, in particular a larger number of slices compared with a standard number of slices, as the section of the object may comprise a characteristic geometry, such as a geometrical details, e.g. a filigree portion.

The corresponding parameter the number of slices of the at least one section of the object is defined dependent on, may be or may comprise at least one geometrical parameter and/or at least one physical parameter and/or at least one chemical parameter and/or at least one process parameter. Dependent on said parameters it is possible to identify a number of slices the respective section has to be sliced to ensure the section of the object can be properly built, in particular properly consolidated. The number of slices may, in particular, dependent on physical parameters, such as mechanical parameters, e.g. mechanical stability of the object that can be influenced with the number of slices, as described before. Further at least one chemical parameter may influence the number of slices at least one section of the object is sliced, for example which build material is used and the consolidation behavior of the respective build material. An additional parameter that can influence the number of slices may be a process parameter relating to at least one process step of the additive manufacturing process.

Further, the parameter may relate to a geometrical feature in a portion of the at least one section of the object, in particular dependent on a spherical portion and/or a pointed end of a portion and/or a wall thickness of a portion and/or a ratio between a wall thickness and a core thickness and/or the shape of at least one edge of the section. Thus, the at least one parameter may relate to a geometrical feature, wherein the parameter describes or determines whether a geometrical feature is present in a section of the object. Dependent on the specific geometrical feature that is present in the section of the object or the object comprises in the corresponding section, the number of slices in this section can be adjusted.

Preferably, the at least one parameter may be determined, in particular the at least one geometrical feature may be determined via pattern recognition. Alternatively, the at least one parameter may be defined, for example by a user or automatically by an apparatus. Thus, the object data of the object that has to be additively built can be analysed, in particular a pattern recognition algorithm can be used to determine at least one geometrical feature in a corresponding section of the object. Subsequently, the number of slices in the corresponding section can be adjusted dependent on the determination of the at least one geometrical feature. Thereby, it is further possible to assign defined numbers of slices to defined geometrical features, such as spherical portions or it is further possible to define a fineness of the geometrical feature that is directly related with the number of slices, e.g. the smallest geometrical feature that is present in the section of the object. This allows for having a corresponding section of the object sliced finer, if a geometrical feature is present requiring a corresponding fineness in the additive manufacturing process.

As described before, the parameter dependent on which the number of slices in at least one section of the object is adjusted may refer to at least one process parameter. The at least one process parameter may be or may comprise an irradiation parameter defining a layer thickness of build material to be irradiated in one slice. Thus, it can be defined by the at least one process parameter how much build material can be irradiated in one irradiation step or how much build material shall be applied in one application step that can be irradiated via a corresponding irradiation step. A corresponding layer thickness may, for example, be adjusted in an interval between 10 µm to 500 µm, preferably between 20 µm to 80 µm.

The geometrical parameter, as described before, may comprise a fineness and/or a detail degree of at least one geometrical feature, wherein the number of slices and the fineness and/or the detail degree are direct proportional. In other words, depending on the fineness that is required for the at least one geometrical characteristic or feature to be manufactured properly, the number of slices can be adjusted. Further, a detail degree can be taken into calculation that defines how filigree at least one portion of a section of the object is. Accordingly, the higher the fineness and/or the detail degree of at least one geometrical feature is, the higher the number of slices can be adjusted to ensure that corresponding fine structures or structures with a high detail degree can be manufactured in the additive manufacturing process. It is, for example, possible to determine the smallest detail of the smallest structure present in the corresponding section and choose or adjust the number of slices corresponding to or dependent on the smallest structure present in the section.

According to another embodiment of the inventive method, at least one process parameter may be assigned to at least one portion of at least one section dependent on the at least one geometrical feature. Thus, the at least one geometrical feature that may be determined, as described before, can not only result in a respective adjustment of the number of slices, but at least one process parameter may also be assigned to the respective portion dependent or the at least one geometrical feature. In other words, various process parameters, such as an energy beam intensity or a spot size or the like, may be assigned to a portion of the section of the object, dependent on a corresponding geometrical feature present in the portion of the section.

The at least one process parameter may be or may comprise an energy beam power and/or a spot size and/or a scanning speed of the energy beam and/or an irradiation strategy. The term "irradiation strategy" may refer to the way the energy beam is scanned over the build plane, in particular how different sections of the build plane or of each corresponding layer are irradiated, e.g. an irradiation sequence. The process parameter may therefore, adjust or define how much energy is depleted in a corresponding portion and how the energy is depleted.

Further, the first section of the object and the at least one second section of the object may be arranged in different x-positions and/or y-positions and/or z-positions. Thus, the different sections may be arbitrarily arranged or defined, respectively. It is particularly possible that two or more different (neighbouring or spaced) sections of the object may be sliced differently, in particular the number of slices per object height and/or the number of slices per unit length may differ in at least two sections comprising different positions. For example, a first section may comprise a first number of slices per unit length, whereas a second section that is arranged in a different x- and/or y- and/or z-position as the first section, comprises a second number of slices per unit length differing from the first number of slices per unit length. Of course, it is also possible, that sections with different positions may at least partially overlap in one or more directions, e.g. sections with different x- and/or y and/or z-positions may at least partially overlap in x- and/or y- and/or z-direction.

Besides, the invention relates to a method for generating slice data for at least one object to be manufactured with an apparatus for additively manufacturing three-dimensional objects by means of successive layerwise selective irradiation and consolidation of layers of a build material which can be consolidated by means of an energy source, wherein slice data are provided relating to an application of build material in at least one section of an object to be built, wherein the slice data comprise at least one slice relating to at least one corresponding layer of build material to be applied, wherein the slice data comprise a number of first slices corresponding to a first section of the object and at least a number of second slices corresponding to at least a second section of the object, wherein the number of first slices and the number of second slices differ, wherein the number of first slices per section height and the number of second slices per section height and/or the number of first slices per unit length and the number of second slices per unit length differ.

Of course, all details, features and advantages described with respect to the inventive method for operating the additive manufacturing apparatus are fully transferable to the inventive method for generating the slice data. In particular, the method for generating slice data provides the corresponding slice data that are used in the operation of the apparatus, in particular used to control the application of build material in an additive manufacturing process using an apparatus that is operated via the inventive method.

Additionally, the invention relates to a slicing device for an apparatus for additively manufacturing three-dimensional objects by means of successive layerwise selective irradiation and consolidation of layers of a build material which can be consolidated by means of an energy source, which slicing device is adapted to generate slice data relating to an application of build material in at least one section of an object to be built, wherein the slice data comprise at least one slice relating to at least one corresponding layer of build material to be applied, wherein the slicing device is adapted to generate at least a number of first slices corresponding to a first section of the object and at least a number of second slices corresponding to at least a second section of the object, wherein the number of first slices and the number of second slices differ, wherein the number of first slices per section height and the number of second slices per section height and/or the number of first slices per unit length and the number of second slices per unit length differ.

Further, the invention relates to an apparatus for additively manufacturing three-dimensional objects by means of successive layerwise selective irradiation and consolidation of layers of a build material which can be consolidated by means of an energy source, wherein a slicing device is provided, in particular an inventive slicing device, as described before, that is adapted to generate slice data relating to an application of build material in at least one section of an object to be built, wherein the slice data comprise at least one slice relating to at least one corresponding layer of build material to be applied, wherein the slicing device is adapted to generate at least a number of first slices corresponding to a first section of the object and at least a number of second slices corresponding to at least a second section of the object, wherein the number of first slices and the number of second slices differ, wherein the number of first slices per section height and the number of second slices per section height and/or the number of first slices per unit length and the number of second slices per unit length differ.

Of course, all details, features and advantages described with respect to the inventive method for operating an apparatus for additively manufacturing of three-dimensional objects and the inventive method for generating slice data are fully transferable to the inventive slicing device and the inventive apparatus for additively manufacturing of three-dimensional objects. In particular, the inventive method for operating an apparatus may be performed on the apparatus, wherein slice data are generated, preferably using the inventive method for generating slice data, for example using an inventive slicing device.

Figure 2:
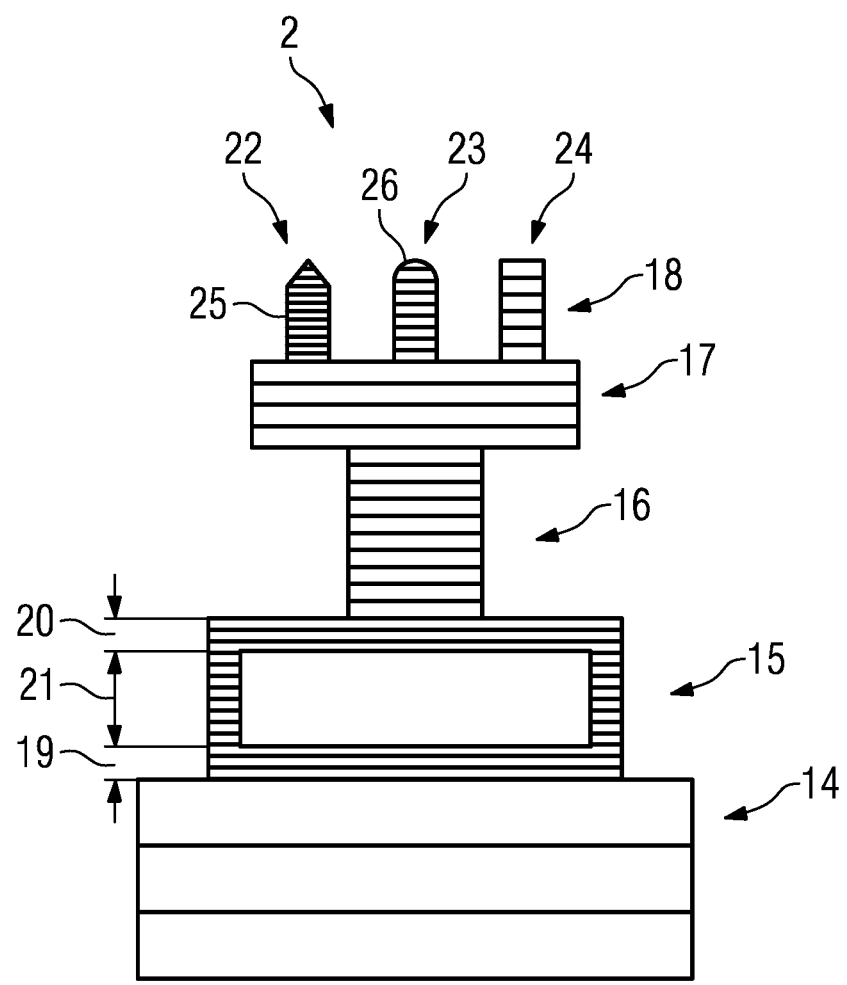

Exemplary embodiments of the invention are described with reference to the Fig. The Fig. are schematic diagrams, wherein FIG. 1 shows an inventive apparatus 1; and FIG. 2 shows slice data generated via an inventive slicing device of the inventive apparatus of FIG. 1

FIG. 1 shows an apparatus 1 for additively manufacturing of three-dimensional objects 2 by means of successive layerwise selective irradiation and consolidation of layers of a build material 3 which can be consolidated by means of an energy source, for example an irradiation device 4 adapted to generate a laser beam 5.

FIG. 1 further shows that a slicing device 6 is provided that is adapted to generate slice data that are related to an application of the build material 3 in a build plane 7 of the apparatus 1. The slice data thus, comprise multiple slices relating to corresponding layers of build material 3 to be applied to form the object 2. In particular, build material 3 is layerwise and successively applied by an application unit 8 from a dose plane 9 to the build plane 7. Each slice of the slice data is directly related to a layer of build material 3 to be applied in the build plane 7. The slicing device 6, for example a computer, therefore, generates the slice data comprising several slices that define how much build material should be applied in the corresponding layer or the layer thickness of each corresponding layer is defined via the corresponding slice, respectively. Of course, build material 3 can be applied in any other arbitrary way, the application of build material provided in a dose plane 9 and conveyed via the application unit 8 onto a build plane 7 is to be understood as merely exemplary.

The apparatus 1 further comprises a control unit 10 that is adapted to control various components of the apparatus 1, such as the application unit 8, the irradiation device 4 or a drive mechanisms 11 assigned to a dose plate 12 or a build plate 13. As can further be derived from FIG. 1, the dose plate 12 and the build plane 13 each are adapted to carry the respective volume of build material 3 or the powder bed containing build material 3 and the additively built object 2 in case of the build plate 13. Accordingly, dependent on a position or a movement of the dose plate 12 corresponding to a respective drive of the driving mechanism 11 moving the dose plate 12, build material 3 can be provided to be applied onto the build plane 7 via the application unit 8. Accordingly, the build plate 13 can be lowered to receive fresh build material 3 conveyed from the dose plane 9 via the application unit 8 to the build plane 7.

Thus, the control unit 10 is adapted to define and adjust a step size in which the corresponding dose plate 12 and build plate 13 are raised or lowered, respectively. The control unit 10 can preferably receive the slice data from the slicing device 6 that define the layer thickness of each layer that has to be applied on the build plane 7. Each slice defines how far the build plane 13 has to be lowered to receive fresh build material 3 forming a fresh layer of build material 3.

The inventive apparatus 1 allows for defining various (at least 2) sections of the object 2 that can be sliced differently. In particular, the number of slices in a first section may differ from a number of slices in an arbitrary other section of the object 2. FIG. 2 shows slice data that are to be understood as merely exemplary. The object 2 according to the exemplary slice data depicted in FIG. 2 comprise five sections 14, 15, 16, 17, 18. For example, object data of the object 2 can be provided or sent to the slicing device 6 which slicing device 6 generates slice data, depicted in FIG. 2, out of the object data, in particular containing the geometrical data of the object 2.

The object 2 or the slice data relating to the object 2, comprise a first section 14 that is sliced into a first number of slices, for example three. As the section 14 of the object 2 comprises a wide a cross-section and does not contain any characteristic (fine) geometrical features, the number of slices in the section 14 is adjusted lower compared to other sections 15-18. By doing so, the section 14 can be manufactured faster, as more build material 3 is applied in one application step by the application unit 8, as the layer thickness of each layer is larger compared with a higher number of slices per unit length or object height in the section 14. To compare the layer thickness and the number of slices for each of the sections 14-18, a number of slices per unit length or per object height can be defined. Thus, for example a number of slices per μm or mm can be defined.

FIG. 2 further shows, that the section 15 of the object 2 comprises three portions 19-21, wherein a first portion 19 and a second portion 20 comprise a smaller diameter/cross-section in which build material has to be applied and therefore, comprise a higher fineness than the object 2 comprises for example in the section 14, as described before. A third portion 21 of the section 15 is built hollow, in that the relation or the ratio between a core of the section 15 and a wall of the section 15 differs, for example from the section 14 or the portions 19, 20 of the section 15. Thus, the fineness of the structure in the portion 21 is higher than in the portions 19, 20. Therefore, the number of slices in the portion 21 is adjusted in that it is higher, in particular the number of slices per unit length in the portion 21 is larger than in the portions 19, 20.

Further, the object 2 comprises a section 16 with a smaller diameter compared to the sections 14, 15. Due to the smaller diameter of the section 16 the section 16 is sliced finer thus, with a higher number of slices per unit length or per section height, respectively, than the section 14, which comprises a larger diameter. The object 2 further comprises a section 17 that comprises a diameter between the diameters of the section 16 and the section 14, wherein the number of slices per unit length of the section 17, or the number of slices per section height, ranges between the number of slices per unit length in the section 14 and the number of slices per unit length in the section 16. As can further be derived from FIG. 2, the total number of slices in the section 16 is larger than in the section 17, as the section 16 is a larger dimension in build direction (upwards) and also has a higher fineness, as described before.

On top of the object 2 another section 18 is provided, that comprises three geometrical features 22, 23 and 24. The geometrical features can be determined, in particular via pattern recognition, from the geometrical data provided with the object 2. Thus, the slicing device 6 is adapted to determine the single geometrical features 22, 23, 24. The geometrical feature 22, for example comprises a pointed end 25, the geometrical feature 23 comprises a spherical portion 26 and the geometrical feature 24 is rectangular. By having the single geometrical features 22-24 determined via the slicing device 6, specific numbers of slices per unit length can be assigned to the geometrical features 22, 23 and 24.

As can further be derived from FIG. 2, the geometrical features 22, 23 and 24 of the section 18 comprise different x-positions (edge of the object 2) and at least partially overlap in z-direction (height of the object 2). Thus, the individual geometrical features 22, 23 and 24 can also be assigned to individual sections 18, wherein the different sections comprise different numbers of slices per unit length.

By having a number of slices defined for each of the sections 14-18, the specific characteristics of the object 2 can be taken into calculation, wherein it can in particular be ensured that details and fine structures of the object 2 can be manufactured, whereas other structures (section 14) can be manufactured as fast as possible.

Of course, the inventive method for operating at least one apparatus for manufacturing three-dimensional object can be performed on the apparatus 1. Further, the method for generating slice data can be performed with the slicing device 6.

The invention claimed is:

1. A method for operating at least one apparatus for additively manufacturing of three-dimensional objects by successive layerwise selective irradiation and consolidation of layers of a build material with an energy source, the method comprising:
generating, with a slicing device, slice data relating to an application of build material in at least one section of an object to be built, wherein the slice data comprise a number of slices relating to corresponding layers of build material to be applied, wherein the slice data comprise:
a plurality of first slices corresponding to a first section of the object; and
a plurality of second slices corresponding to a second section of the object, wherein the plurality of first slices and the plurality of second slices differ in number, wherein a number of first slices per section height and a number of second slices per section height differ and/or a number of first slices per unit length and a number of second slices per unit length differ; and
arranging the first section and the second section in different x-positions and/or y-positions and/or z-positions, wherein the first section and the second section at least partially overlap in a z-direction.

2. The method according to claim 1, wherein a layer thickness of build material to be applied in the first section and a layer thickness in the second section differ.

3. The method according to claim 1, wherein a number of slices of at least one section of the object is defined dependent on at least one parameter of the object.

4. The method according to claim 3, wherein the at least one parameter comprises at least one geometrical parameter and/or at least one physical parameter and/or at least one chemical parameter.

5. The method according to claim 4, wherein the at least one parameter relates to a geometrical feature in a portion of the at least one section of the object, the geometrical feature comprising a spherical portion and/or a pointed end of a portion and/or a wall thickness of a portion and/or a ratio between a wall thickness and a core thickness and/or the shape of at least one edge of the section.

6. The method according to claim 5, wherein the at least one geometrical feature is determined via pattern recognition.

7. The method according to claim 4, wherein the at least one process parameter comprises an irradiation parameter defining a layer thickness of build material to be irradiated in one slice.

8. The method according to claim 4, wherein the at least one parameter comprises the geometrical parameter, which comprises a fineness and/or a detail degree of at least one geometrical feature, wherein the number of slices and the fineness and/or the detail degree are directly proportional.

9. The method according to claim 1, wherein at least one process parameter is assigned to at least one portion of at least one section dependent on the at least one geometrical feature.

10. The method according to claim 9, wherein the process parameter comprises an energy beam power and/or a spot size and/or a scanning speed of the energy beam and/or an irradiation strategy.

11. A method for generating slice data for at least one object to be manufactured with an apparatus for additively manufacturing three-dimensional objects by means of successive layerwise selective irradiation and consolidation of layers of a build material with an energy source, the method comprising:
generating, with a slicing device, slice data relating to an application of build material in at least one section of an object to be built, wherein the slice data comprise at least one slice relating to at least one corresponding layer of build material to be applied, wherein the slice data comprise:
a plurality of first slices corresponding to a first section of the object and
a plurality of second slices corresponding to a second section of the object, wherein the plurality of first slices and the plurality of second slices differ in number, wherein a number of first slices per section height and a number of second slices per section height differ and/or a number of first slices per unit length and a number of second slices per unit length differ; and arranging the first section and the second section in different x-positions and/or y-positions and/or z-positions, wherein the first section and the second section at least partially overlap in a z-direction.

12. A slicing device for an apparatus for additively manufacturing three-dimensional objects by successive layerwise selective irradiation and consolidation of layers of a build material with an energy source, wherein the slicing device is adapted to generate slice data relating to an application of build material in at least one section of an object to be built, wherein the slice data comprise at least one slice relating to at least one corresponding layer of build material to be applied, wherein the slicing device is adapted to generate:
- a plurality of first slices corresponding to a first section of the object; and
- a plurality of second slices corresponding to at least a second section of the object, wherein the plurality of first slices and the plurality of second slices differ in number, wherein a number of first slices per section height and a number of second slices per section height differ and/or a number of first slices per unit length and a number of second slices per unit length differ, wherein the first section and the second section are arranged in different x-positions and/or y-positions and/or z-positions, and wherein the first section and the second section at least partially overlap in a z-direction.

13. A slicing device for an apparatus for additively manufacturing three-dimensional objects by successive layerwise selective irradiation and consolidation of layers of a build material with an energy source, wherein the slicing device is adapted to generate slice data relating to an application of build material in at least one section of an object to be built, wherein the slice data comprise at least one slice relating to at least one corresponding layer of build material to be applied, wherein the slicing device is further adapted to generate:
- a plurality of first slices corresponding to a first section of the object; and
- a plurality of second slices corresponding to at least a second section of the object, wherein the plurality of first slices and the plurality of second slices differ, and wherein a number of first slices per section height and a number of second slices per section height differ and/or a number of first slices per unit length and a number of second slices per unit length differ, wherein the slicing device is adapted to perform the method according to claim 1.

14. An apparatus for additively manufacturing three-dimensional objects by successive layerwise selective irradiation and consolidation of layers of a build material with an energy source, wherein a slicing device is provided, the slicing device adapted to generate slice data relating to an application of build material in at least one section of an object to be built, wherein the slice data comprise at least one slice relating to at least one corresponding layer of build material to be applied, wherein the slicing device is adapted to generate:
- a plurality of first slices corresponding to a first section of the object; and
- a plurality of second slices corresponding to at least a second section of the object, wherein the plurality of first slices and the plurality of second slices differ, and wherein a number of first slices per section height and a number of second slices per section height differ and/or a number of first slices per unit length and a number of second slices per unit length differ, wherein the first section and the second section are arranged in different x-positions and/or y-positions and/or z-positions, and wherein the first section and the second section at least partially overlap in a z-direction.

15. The method according to claim 1, wherein the number of first slices per section height and the number of second slices per section height differ.

16. The method according to claim 11, wherein a layer thickness of build material to be applied in the first section and a layer thickness in the second section differ.

17. The method according to claim 11, wherein a number of slices of at least one section of the object is defined dependent on at least one parameter of the object.

18. The apparatus according to claim 14, wherein a layer thickness of build material to be applied in the first section and a layer thickness in the second section differ.

19. The apparatus according to claim 14, wherein a number of slices of at least one section of the object is defined dependent on at least one parameter of the object.

* * * * *